US010671560B2

(12) United States Patent
Brown et al.

(10) Patent No.: US 10,671,560 B2
(45) Date of Patent: Jun. 2, 2020

(54) SERIAL CONNECTION BETWEEN MANAGEMENT CONTROLLER AND MICROCONTROLLER

(71) Applicant: HEWLETT PACKARD ENTERPRISE DEVELOPMENT LP, Houston, TX (US)

(72) Inventors: Andrew Brown, Houston, TX (US); David Heinrich, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 129 days.

(21) Appl. No.: 15/716,934

(22) Filed: Sep. 27, 2017

(65) Prior Publication Data
US 2019/0095377 A1   Mar. 28, 2019

(51) Int. Cl.
*G06F 13/42* (2006.01)
*G06F 13/40* (2006.01)
*G06F 13/16* (2006.01)

(52) U.S. Cl.
CPC ...... *G06F 13/4213* (2013.01); *G06F 13/1673* (2013.01); *G06F 13/4027* (2013.01); *G06F 13/4072* (2013.01); *G06F 13/4286* (2013.01); *G06F 13/4291* (2013.01)

(58) Field of Classification Search
None
See application file for complete search history.

(56) References Cited

U.S. PATENT DOCUMENTS

| 10,020,847 | B2 * | 7/2018 | Brahami | H04B 5/0031 |
| 10,241,555 | B2 * | 3/2019 | Ahmed | G06F 1/3212 |
| 2002/0059492 | A1 * | 5/2002 | Sabotta | G06F 13/4022 |
| | | | | 710/301 |
| 2007/0011507 | A1 | 1/2007 | Rothman et al. | |

(Continued)

FOREIGN PATENT DOCUMENTS

| CN | 104021060 A | 9/2014 |
| CN | 204215266 U | 3/2015 |

(Continued)

OTHER PUBLICATIONS

John Efstathiades, "7 Uses for a Serial Port in an Embedded System," Blog, Feb. 10, 2015, pp. 1-4, Retrieved online Jun. 14, 2017, <http://www.pebblebay.com/embedded-systems-serial-communication/>.

(Continued)

*Primary Examiner* — Henry Tsai
*Assistant Examiner* — Aurangzeb Hassan
(74) *Attorney, Agent, or Firm* — Hewlett Packard Enterprise Patent Department

(57) ABSTRACT

An example computing system includes a baseboard management controller (BMC), a motherboard, and a daughterboard communicatively coupled to the motherboard. The BMC includes a serial interface. The daughterboard includes a universal asynchronous receiver/transmitter (UART) terminal, a bridging chip, and a microcontroller communicatively coupled to the BMC via the bridging chip. The BMC establishes a serial connection, through the serial interface and the UART terminal, with the microcontroller.

15 Claims, 9 Drawing Sheets

(56) References Cited

U.S. PATENT DOCUMENTS

| | | | |
|---|---|---|---|
| 2008/0162956 A1* | 7/2008 | Bozek | G06F 1/3209 |
| | | | 713/310 |
| 2008/0162958 A1* | 7/2008 | Bozek | G06F 1/3209 |
| | | | 713/310 |
| 2013/0117766 A1* | 5/2013 | Bax | G06F 9/4405 |
| | | | 719/323 |
| 2016/0080210 A1 | 3/2016 | Lai et al. | |
| 2016/0261455 A1* | 9/2016 | Su | H04L 41/069 |
| 2016/0283424 A1* | 9/2016 | Richardson | G06F 13/362 |
| 2017/0134217 A1* | 5/2017 | Ahmed | H04L 41/044 |
| 2017/0171023 A1* | 6/2017 | Chiu | H04L 41/0893 |

FOREIGN PATENT DOCUMENTS

| | | |
|---|---|---|
| WO | 2007/004178 A1 | 1/2007 |
| WO | WO-2017069823 A1 | 4/2017 |

OTHER PUBLICATIONS

Kernelpro Software, "Advanced Virtual Com Port," 2014, pp. 1-2 [online], Retrieved online Jun. 14, 2017, <http://www.advancedvirtualcomport.com/>.

European Search Report and Search Opinion Received for EP Application No. 18194126.1, dated Feb. 12, 2019, 8 pages.

\* cited by examiner

SERIAL CONNECTION BETWEEN MANAGEMENT CONTROLLER AND MICROCONTROLLER

BACKGROUND

In certain computing systems, a baseboard management controller (BMC) is installed to provide remote management functions for the computing system. An administrator may log into the BMC (e.g. through a separate management network card) and gather status information from the computing system. The BMC may be able to communicate with the computing system using multiple communication protocols.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Figure 1:
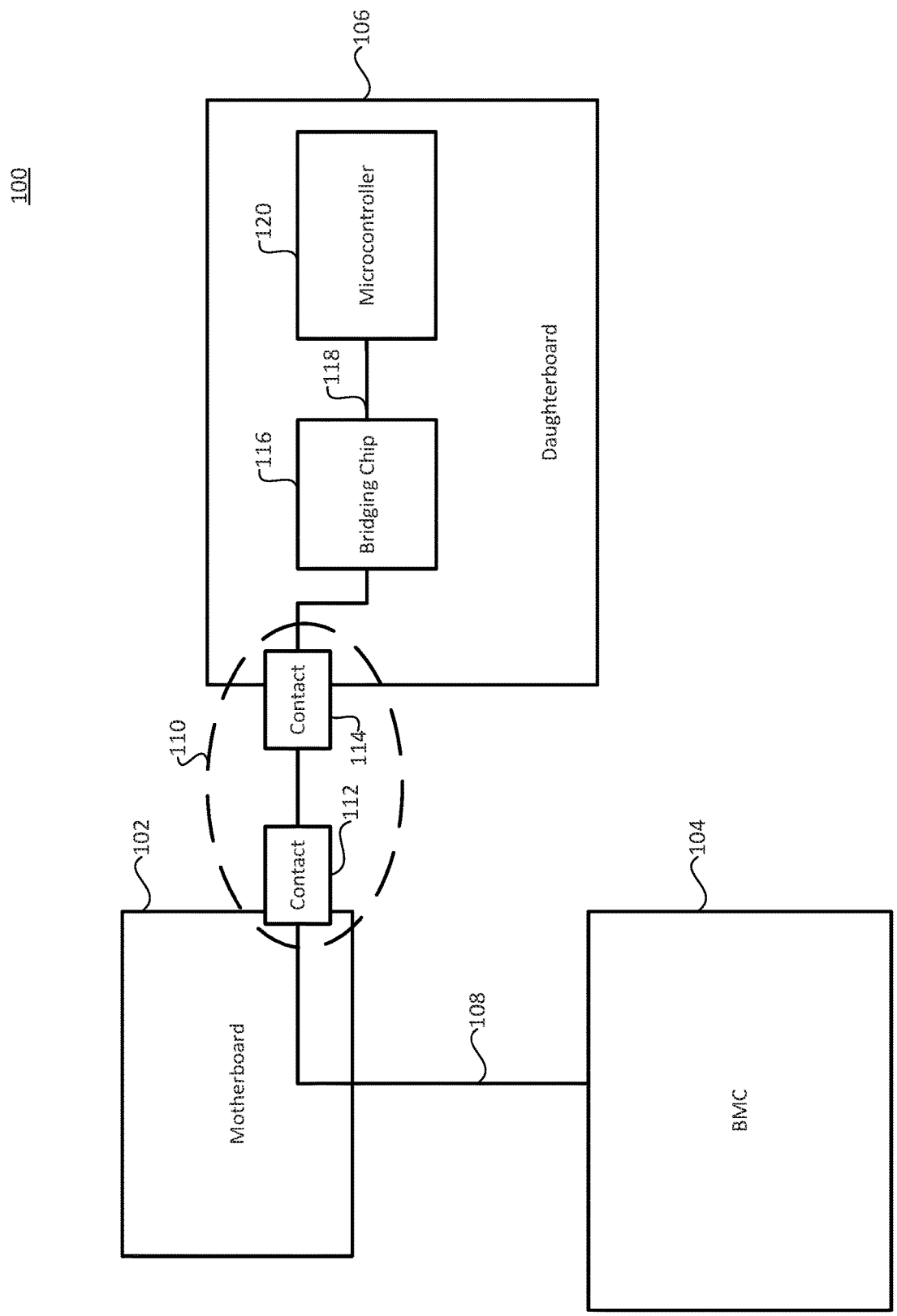
FIG. 1 illustrates an example computing system including a baseboard management controller (BMC), motherboard, and daughterboard.

certain examples have features that are in addition to or in lieu of the features illustrated in the above-referenced figures.

DETAILED DESCRIPTION

In certain computing systems, including servers, an administrator may manage the system remotely. In some systems, this remote management is achieved through a management network. The management network may include a baseboard management controller (BMC) which include a network interface card (NIC) separate from the server's data connection NIC. The BMC gives the administrator access to status information about the server and the ability to send administrative commands to the server through the BMC. The administrator may connect an administrator device to the BMC through a secure shell (SSH) connection.

Certain computing systems include a motherboard that receives a central processing unit (CPU) and other components of the computing system. Some motherboards include adapters to interface with daughterboards that may extend the capabilities of the computing system. One common type of daughterboard is a Peripheral Component Interconnect Express (PCI-E) card. A PCI-E card may include electrical traces, electrical components, and integrated circuits. In some examples, the PCI-E card includes a microcontroller that operates in a high-power mode when the computing system is powered on and operates in a low-power mode with the computing system is powered off. Such PCI-E cards may include a Management Component Transport Protocol (MCTP) interface that is enabled once the microcontroller is operating in the high-power mode. In certain examples, the MCTP interface is enabled after portions of a "power up" procedure are executed by the microcontroller to transition from the low-power mode to the high-power mode. The microcontroller may execute instructions to enable the MCTP interface. In some examples, the microcontroller contains a universal asynchronous receiver/transmitter (UART) terminal capable of interactive, bidirectional communication.

The UART terminal of the microcontroller may not correspond to an interface between the PCI-E card and the motherboard. In certain examples, however, the PCI-E card includes an inter-integrated circuit (I2C) interface to the motherboard. Such PCI-E cards may include a bridging chip to convert I2C signals to UART signals, and vice versa, allowing a serial connection to be established with the microcontroller for management tasks, even when the MCTP interface is not enabled. In certain computing systems, a serial interface (e.g. I2C interface) between the BMC and the motherboard is coupled to a serial interface (e.g. I2C interface) between the motherboard and the PCI-E card, allowing an authenticated administrator to establish a serial connection with the microcontroller of the PCI-E card. Data associated with the serial connection may pass through the SSH connection between the administrator and the BMC, the I2C interface between the BMC and the motherboard, the I2C interface between the motherboard and the PCI-E card, the bridging chip of the PCI-E card, and the UART terminal of the microcontroller. In this disclosure, the term "interface" is used for data lines that pass from one circuit board to another. For example, the I2C interface between the BMC and the motherboard refers to one or more data lines on the BMC that are electrically coupled to corresponding data lines on the motherboard. In this disclosure, the term "terminal" is used for one or more pins of an electrical component used for data communication. For example, the UART terminal of the microcontroller refers to one or more pins of the microcontroller dedicated to transceiving UART signals.

In an example operation, the microcontroller of daughterboard, during initialization of the computing system, may detect that there is an error. Once the error is detected, the microcontroller still has not enabled MCTP, so it cannot transmit error logging information in that method. However, the UART terminal of the microcontroller is enabled, and the I2C system of the computing system is enabled as well. The microcontroller sends error logging information through the UART terminal to the BMC, where an administrator can access the error logging information.

In another example operation, an administrator device establishes an authenticated connection with the BMC (e.g. an SSH connection). The administrator device sends commands through the BMC to the microcontroller of the daughterboard to interrogate the microcontroller. The administrator device may request error logs, status information, identification information, and any other information that the microcontroller is capable of providing through its UART terminal. The administrator device also sends commands through the BMC to the microcontroller of the daughterboard to reconfigure the microcontroller. The administrator device may alter a logging level of the microcontroller, toggle the microcontroller between the high-power mode and the low-power mode, and alter any other configuration parameter capable of being altered through the UART terminal of the microcontroller.

FIG. 1 illustrates an example computing system including a BMC and a daughterboard. Computing system 100 includes a motherboard 102, a BMC 104, and a daughterboard 106. In some examples, motherboard 102 includes a processor, memory, and other computing system components. Motherboard 102 may include adapters to couple with daughterboards. One such adapter may receive a complementary adapter on BMC 104, creating an interface between BMC 104 and motherboard 102. Another such adapter may receive a complementary adapter on daughterboard 106, creating an interface between motherboard 102 and daughterboard 106. In this disclosure, an "interface" is created when an adapter of a component of the computing system is electrically coupled with a complementary adapter of another component of the computing system. As appropriate given the context, the term "interface" may describe the entirety of the coupled adapters or a subset of the electrical connections established when the adapters are coupled to one another.

In some examples, daughterboard 106 is a PCI-E card. In such examples, daughterboard 106 couples with a PCI-E adapter on motherboard 102, which may be connected to related PCI components (e.g. a bus, a controller). The PCI-E card may be indirectly connected to the CPU of motherboard 102 and other components, including BMC 104, through a northbridge or similar component on motherboard 102. In certain examples, BMC 104 is a component of motherboard 102. In certain other examples, BMC 104 is a daughterboard coupled to motherboard 102. In yet other examples, BMC 104 is a module of a modular server (e.g. a blade system, converged system, composable system) that is retained in a modular server enclosure and electrically coupled to motherboard 102 (e.g. through a backplane or midplane). In certain examples, the interface between BMC 104 and motherboard 102 includes an I2C interface 108. I2C interface 108 may include multiple electrical connections. In some examples, I2C interface 108 includes a serial data line (SDA) and a serial clock line (SCL), each of which are bidirectional.

In certain examples, I2C interface 108 is electrically coupled to another I2C interface 110, which includes a first contact 112 of motherboard 102 and a second contact 114 of daughterboard 106. I2C interface 110 may include additional contacts not shown in FIG. 1. When motherboard 102 and daughterboard 106 are coupled, an electrical connection may be formed between first contact 112 and second contact 114, creating I2C interface 110. I2C interface 110, in combination with I2C interface 108 provides a communicative coupling of BMC 104 with daughterboard 106.

In some examples, BMC 104 transmits an I2C signal across I2C interface 108, through components of motherboard 102, and through I2C interface 110 to bridging chip 116 of daughterboard 106. Bridging chip 116 may include a signal buffer to retain data transmitted to it until the destination component signals that it is ready to receive the data. Bridging chip 116 may convert an I2C signal into a UART signal and vice versa. In some examples, bridging chip 116 establishes a first serial connection with BMC 104 and a second serial connection with microcontroller 120. In some other examples, bridging chip 116 merely converts the data without acting as an intermediary, meaning that BMC 104 directly establishes a serial connection with microcontroller 120. When an I2C signal is received at bridging chip 116 from BMC 104, bridging chip 116 may accumulate portions of the signal in a buffer until enough data is received to generate a corresponding UART signal. Bridging chip 116 may then transmit a converted UART signal to a UART terminal of microcontroller 120 through data line 118. In some examples, more than one data line 118 may be used to transceive UART signals. In certain examples, one data line 118 carries signals from bridging chip 116 to microcontroller 120 and another data line 118 carries signals from microcontroller 120 to bridging chip 116. When a UART signal is received at bridging chip 116 from microcontroller 120, bridging chip 116 may accumulate portions of the signal in a buffer until enough data is received to generate a corresponding I2C signal. Bridging chip 116 may then transmit a converted I2C signal across I2C interfaces 108 and 110 to BMC 104.

In some examples, the serial connection between BMC 104 and microcontroller 120 is interactive, meaning that BMC 104 can transmit a command and microcontroller 120 will transmit a response to the command. For example, BMC 104 can transmit a command requesting a model number of microcontroller 120, and microcontroller 120 will transmit a response including its model number. In certain examples, BMC 104 establishes a first serial connection with an administrator device and a second serial connection with microcontroller 120. In such examples, BMC 104 may act as an intermediary between the administrator device and microcontroller 120. BMC 104 may receive commands relevant to microcontroller 120 from the administrator device and may convert those commands into an appropriate I2C signal to be sent through I2C interface 108.

Figure 2:
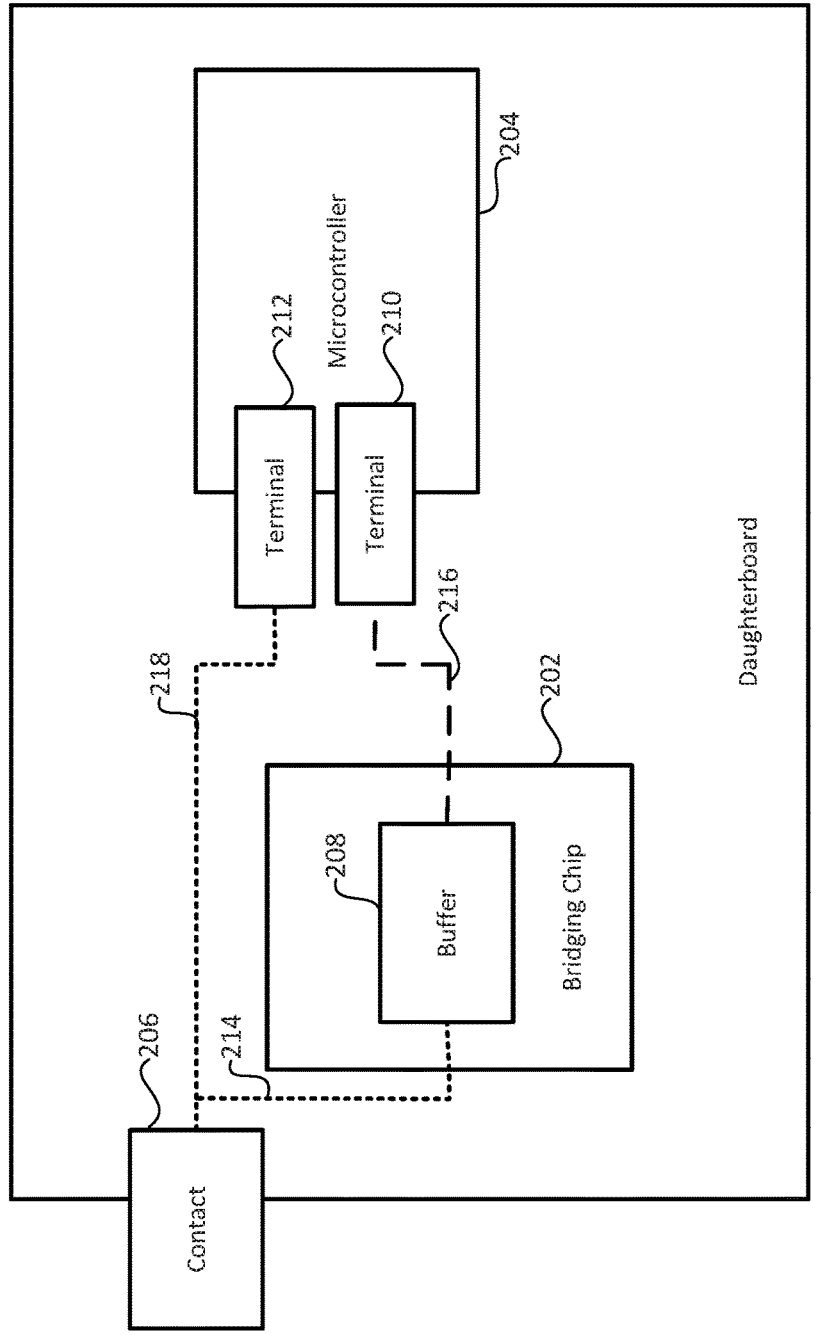
FIG. 2 illustrates an example daughterboard including a bridging chip and a microcontroller.

FIG. 2 illustrates an example daughterboard including a microcontroller and a bridging chip. Daughterboard 200 contains a bridging chip 202, a microcontroller 204, and a contact 206. Bridging chip 202 contains a buffer 208. Microcontroller 204 contains terminals 210 and 212. In some examples, bridging chip 202 and microcontroller 204 both reside on a single integrated circuit. In some other examples, bridging chip 202 is a separate component from microcontroller 204. Contact 206 is communicatively coupled to bridging chip 202 through I2C trace 214. Contact 206 is communicatively coupled to terminal 212 of microcontroller 204 through I2C trace 218. Bridging chip 202 is communicatively coupled to terminal 212 of microcontroller 204 through UART trace 216. In this disclosure, the term "trace" is used to mean an electrically conductive connection to transport electrical signals between two components. In some examples, a "trace" is an electrical line on a printed circuit board. In some other examples, a "trace" may be a via in an integrated circuit, or a wire soldered to daughterboard 200.

In some examples, contact 206 is electrically coupled to a complementary contact on a motherboard of a computing system, creating an I2C interface. An I2C signal received at contact 206 from the complementary contact may be forwarded across I2C trace 214 to bridging chip 202. In some examples, all signals received at contact 206 from the complementary contact are forwarded to both terminal 212 and bridging chip 202 through I2C traces 218 and 214, respectively. In some other examples, a routing component (not shown) of daughterboard 200 sends received signals associated with a serial connection established between microcontroller 204 and a BMC to bridging chip 202 and sends all other received signals to terminal 212.

In certain examples, when a signal is received at bridging chip 202, portions of the signal are buffered in buffer 208. In some examples, buffer 208 includes a UART buffer for UART to I2C conversion and an I2C buffer for I2C to UART conversion. In some other examples, buffer 208 is a single bidirectional buffer. Bridging chip 202 may receive an I2C signal from I2C trace 214 and may begin buffering portions of the I2C signal in buffer 208. In some examples, upon filling buffer 208 beyond a certain threshold, bridging chip 202 outputs a converted UART signal on UART trace 216 to UART terminal 210. In some other examples, bridging chip 202 outputs a converted UART signal after receiving a request from microcontroller 204 to retrieve the converted UART signal. Buffer 208 may be sized so that it can retain enough data from the I2C signal to generate a complete data packet to be sent via UART. Similarly, bridging chip 202 may receive a UART signal from UART trace 216 and may begin buffering portions of the UART signal in buffer 208. In some examples, upon filling buffer 208 beyond a certain threshold, bridging chip 202 outputs a converted I2C signal on I2C trace 214 to contact 206. In some other examples, bridging chip 202 outputs a converted I2C signal after receiving a request from the BMC to retrieve the converted I2C signal. Buffer 208 may be sized so that it can retain enough data from the UART signal to generate a complete data packet to be sent via I2C.

Certain I2C signals received at contact 206 from the complementary contact of the motherboard may not be associated with the serial connection established between microcontroller 204 and the BMC. These I2C signals may relate to processes other than management via the BMC. In some examples, these I2C signals may be forwarded through I2C trace 218 and through I2C trace 214, resulting in bridging chip 202 filtering these I2C signals and not sending them through UART trace 216. In some other examples, a routing component (not shown) of daughterboard 200 may send these I2C signals through I2C trace 218 to I2C terminal 212.

FIG. 3 illustrate an example signal flow through an example computing system. Certain components of the computing system (e.g. the motherboard) have been omitted for clarity's sake. Computing system 300 includes a BMC 302 and a daughterboard 304. BMC 302 is communicatively coupled to daughterboard 304 through I2C line 306. I2C line 306 may include more than one electrical line in some examples. For example, I2C line 306 may include a SDA line and a SCL line. In certain examples I2C line 306 passes through I2C interfaces and a motherboard between BMC 302 and daughterboard 304. I2C line 306 couples to bridging chip 308, which is coupled, in turn, to UART line 312. Similarly to I2C line 306, UART line 312 may include multiple electrical lines. For example, UART line 312 may include a data line for signals transmitted from bridging chip 308 to microcontroller 310 and a second data line for signals transmitted from microcontroller 310 to bridging chip 308.

Figure 3A:
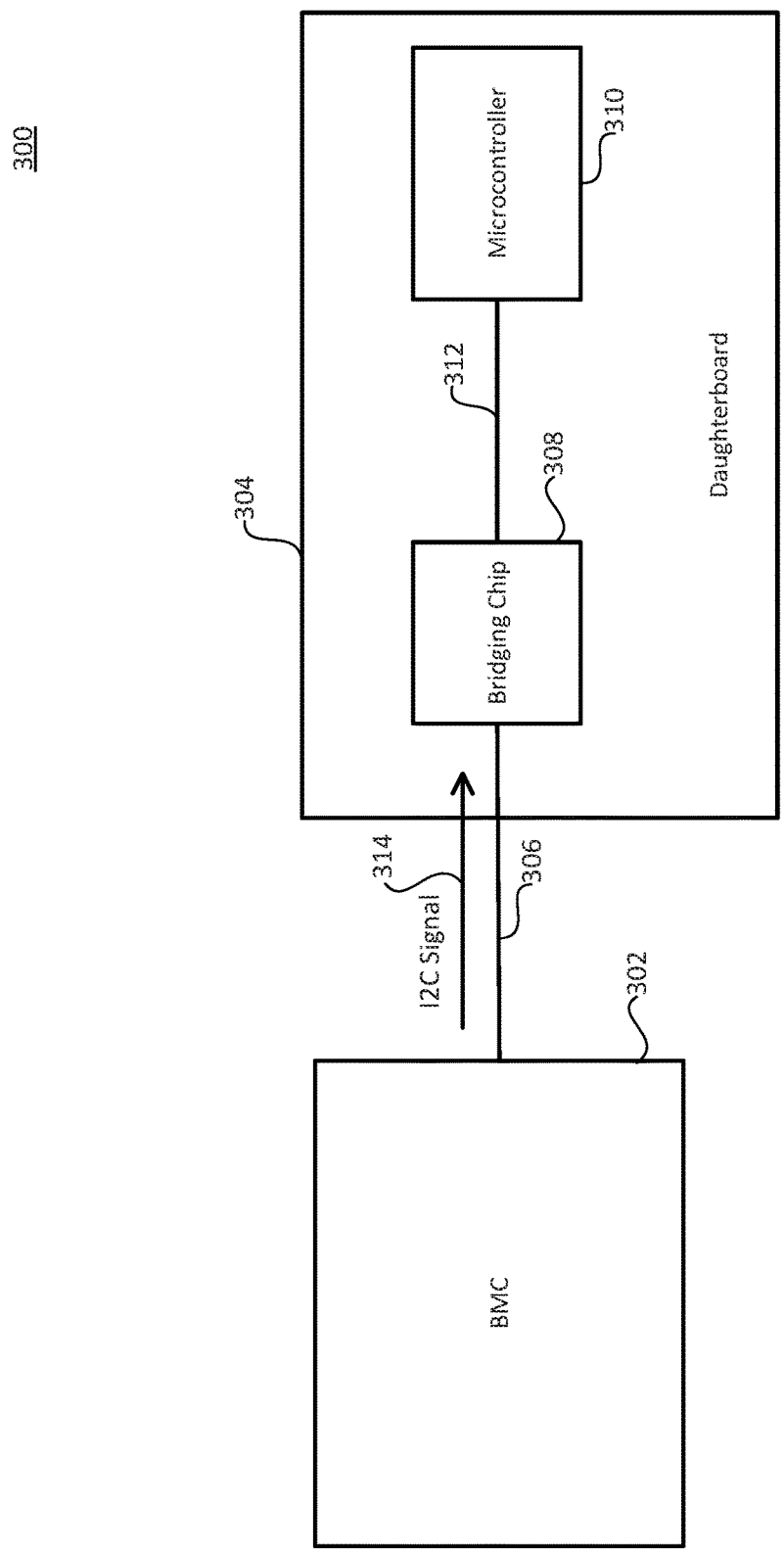
FIGS. 3A-3D illustrate an example computing system communicating through a serial connection.

In FIG. 3A, an example I2C signal is sent through example computing system 300. BMC 302 sends I2C signal 314 across I2C line 306 to bridging chip 308. In some examples, BMC 302 has established a serial connection with microcontroller 310 and I2C signal 314 is associated with the serial connection. For example, I2C signal 314 may contain identifying information that associates it with the serial connection. In certain examples, BMC 302 has established a second serial connection with an administrator device, and BMC 302 generates I2C signal 314 based on a command received from the administrator device. In some examples, I2C signal 314 includes multiple packets, each of which contains a portion of a command destined for microcontroller 310. In some other examples, I2C signal 314 is a single serial transmission of data containing the entirety of the command destined for microcontroller 310.

Bridging chip 308, upon receiving I2C signal 314, may retain data from I2C signal 314. In some examples, data from I2C signal 314 is combined with data from other I2C signals received at bridging chip 308 to create the entire command sent by BMC 302. In some other examples, I2C signal 314 requires a substantial number of clock cycles to be fully received, and bridging chip 308 retains portions of I2C signal 314 until enough of the data is received to enable transmission of the data retained in the buffer as a UART signal. In certain examples, bridging chip 308 retains data from I2C signal 314 in the buffer until microcontroller 310 requests to receive the data.

Figure 3B:
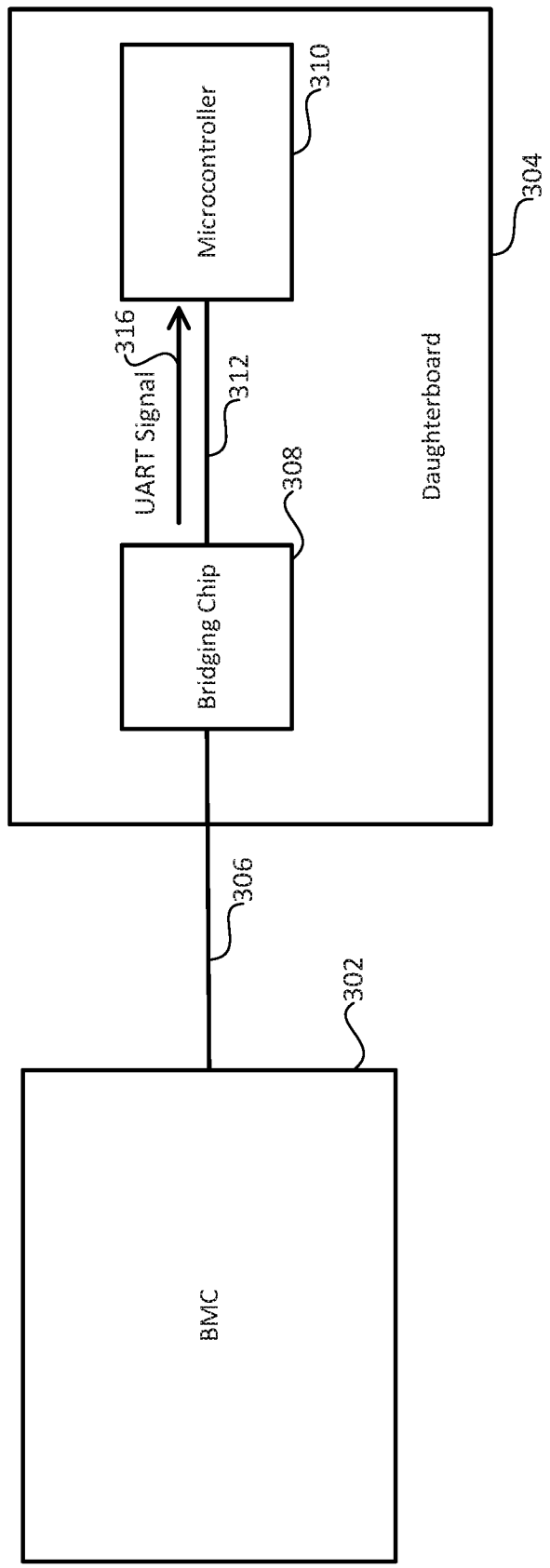

In FIG. 3B, an example converted UART signal is sent through example computing system 300. UART signal 316 is converted from I2C signal 314 received at bridging chip 308. UART signal 316 contains a command transmitted from BMC 302 and destined for microcontroller 310. The command is associated with a serial connection established between BMC 302 and microcontroller 310. In some examples, UART signal 316 contains multiple data packets, each including a portion of the command. In such examples, microcontroller 310 retains the data from each packet and synthesizes the command once the entirety of the command is received. In some other examples, UART signal 316 requires a substantial number of clock cycles to be fully received, and microcontroller 310 retains portions of UART signal 316 until the entirety of the command is received.

Figure 3C:
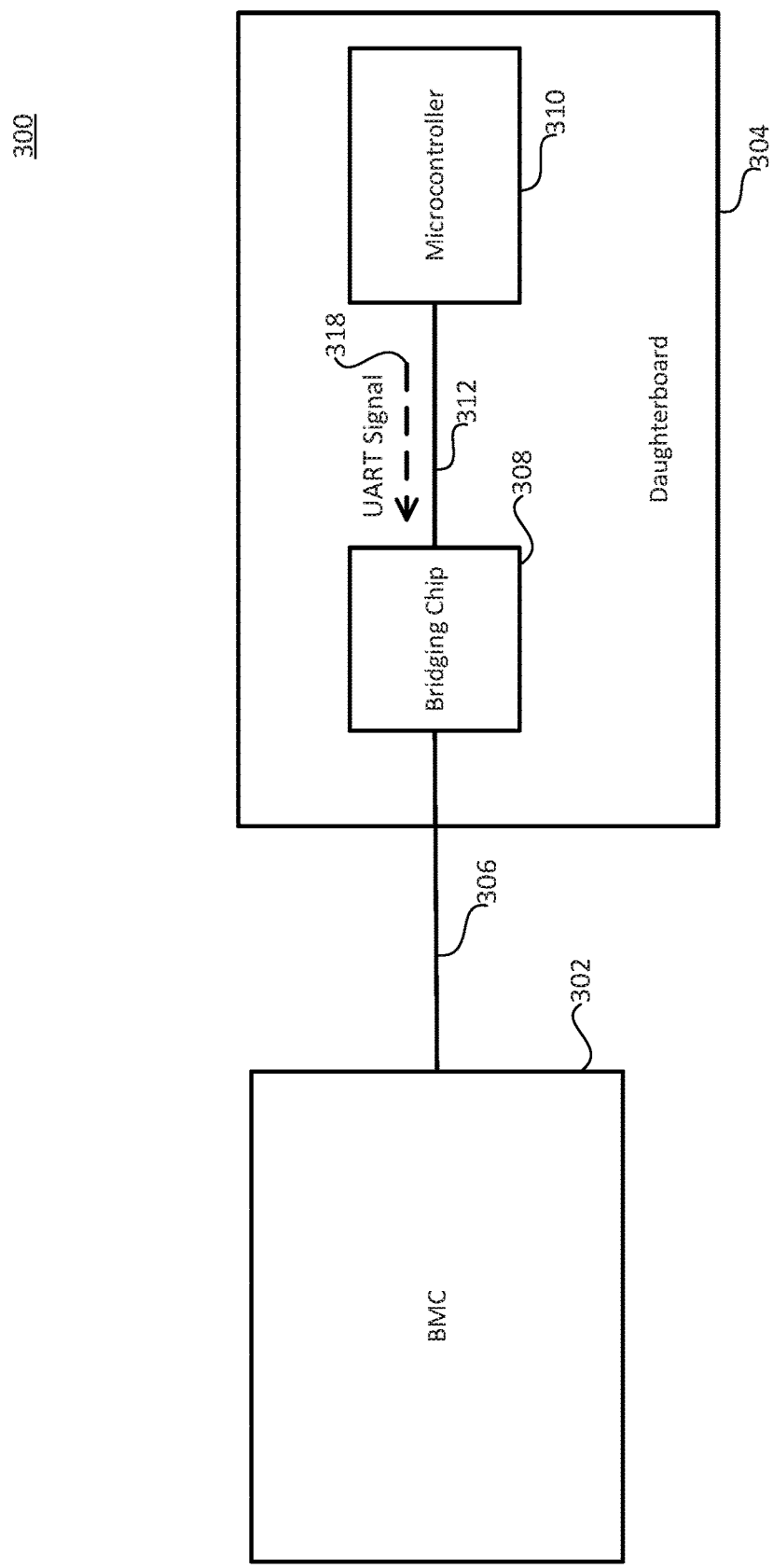

In FIG. 3C, an example UART signal is sent through example computing system 300. UART signal 318 is sent from a UART terminal of microcontroller 310 to bridging chip 308 through UART line 312. In some examples, UART signal 318 is a reply to a command received from BMC 302. In some other examples, transmission of UART signal 318 is initiated by microcontroller 310 detecting an error condition. UART signal 318 includes a message from microcontroller 310 to BMC 302 associated with a serial connection established between microcontroller 310 and BMC 302. UART signal 318 may include logging data from microcontroller 310. In some examples, UART signal 318 includes a confirmation of a configuration change requested in a command received from BMC 302. In some examples, UART signal 318 contains multiple data packets, each including a portion of data. In such examples, bridging chip 308 retains the data from each packet in a buffer. In some examples, data from UART signal 318 is combined with data from other UART signals received at bridging chip 308 to create the entire message sent by microcontroller 310. In some other examples, UART signal 318 requires a substantial number of clock cycles to be fully received, and bridging chip 308 retains portions of UART signal 318 until enough of the data is received to enable transmission of the data retained in the buffer as an I2C signal. In certain examples, bridging chip 308 retains data from UART signal 318 in the buffer until BMC 302 requests to receive the data.

Figure 3D:
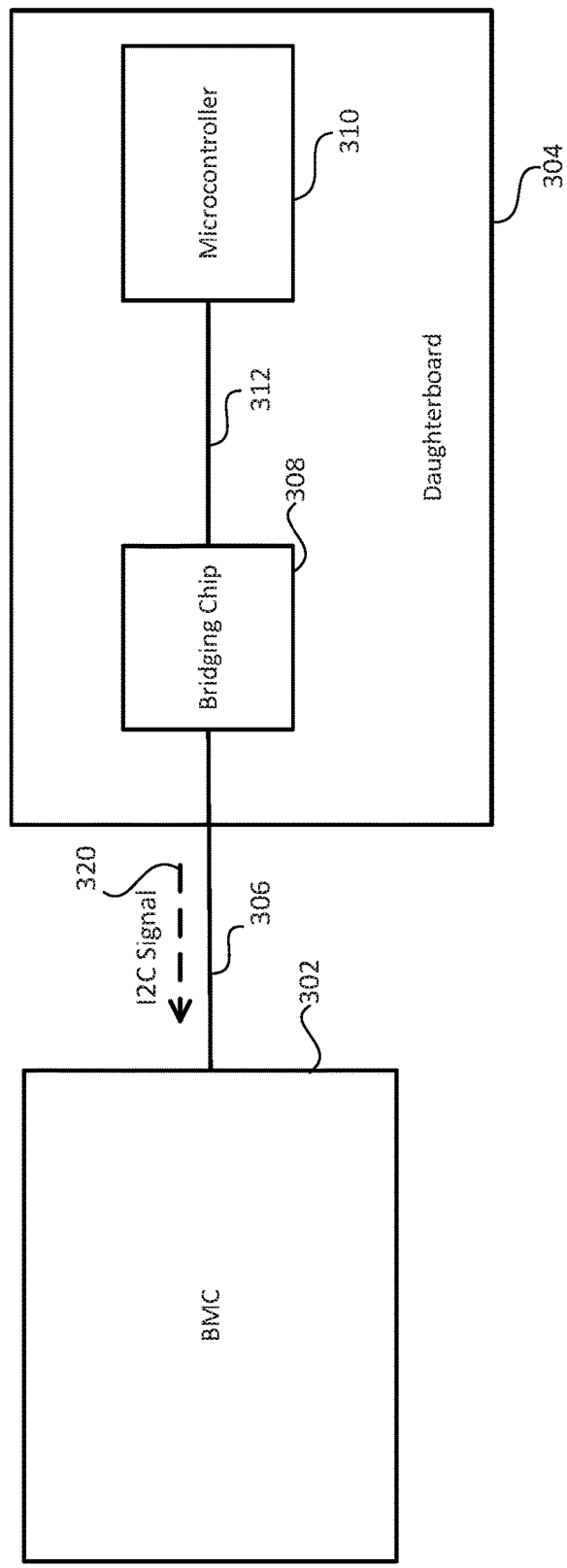

In FIG. 3D, an example converted I2C signal is sent through example computing system 300. I2C signal 320 is converted from UART signal 318 received at bridging chip 308. I2C signal 320 contains a message transmitted from microcontroller 310 and destined for BMC 302. The message is associated with a serial connection established between BMC 302 and microcontroller 310. In some examples, I2C signal 320 contains multiple data packets, each including a portion of the message. In such examples, BMC 302 retains the data from each packet and synthesizes the message once the entirety of the message is received. In some other examples, I2C signal 320 requires a substantial number of clock cycles to be fully received, and BMC 302 retains portions of I2C signal 320 until the entirety of the message is received. In certain examples, BMC 302 sends a request to bridging chip 308 to receive the message, resulting in bridging chip 308 sending I2C signal 320.

Figure 3E:
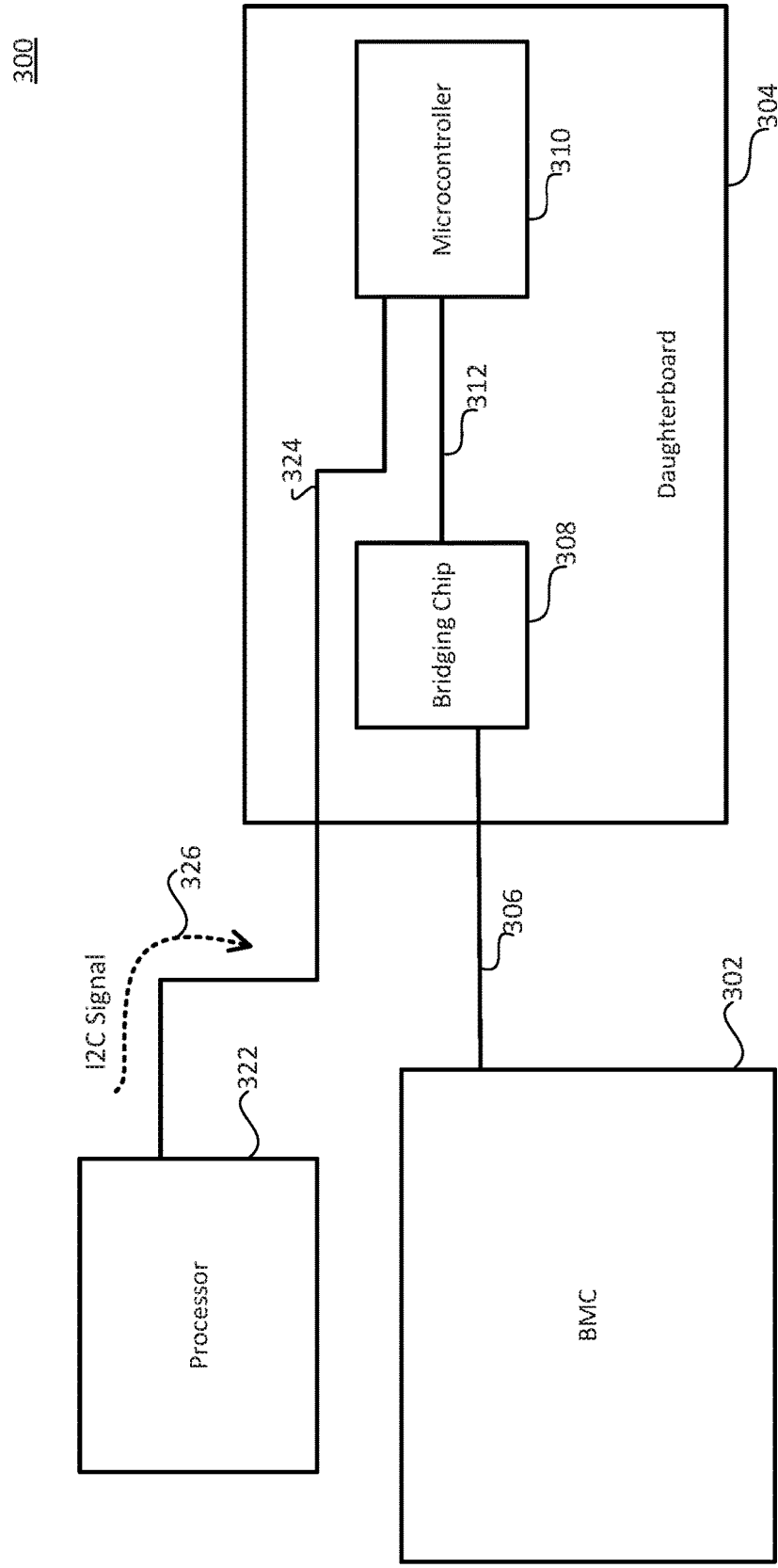
FIG. 3E illustrates an example computing system communicating between a processor and a microcontroller.

In FIG. 3E, an example I2C signal is sent through example computing system 300. I2C signal 326 is sent from processor 322 via I2C line 324 to microcontroller 310. In some examples, I2C line 324 transits between a motherboard and daughterboard 304 using the same electrical contacts as I2C line 306. In such examples, the motherboard and daughterboard 304 may contain components to route I2C signals from and to the appropriate destinations. In some other examples, I2C line 324 is entirely separate from I2C line 306. I2C signal 326 is not associated with the serial connection between BMC 302 and microcontroller 310. I2C signal 326 is not received by microcontroller 310 at its UART terminal, but rather at its I2C terminal. I2C signal 326 bypasses bridging chip 308.

Figure 4:
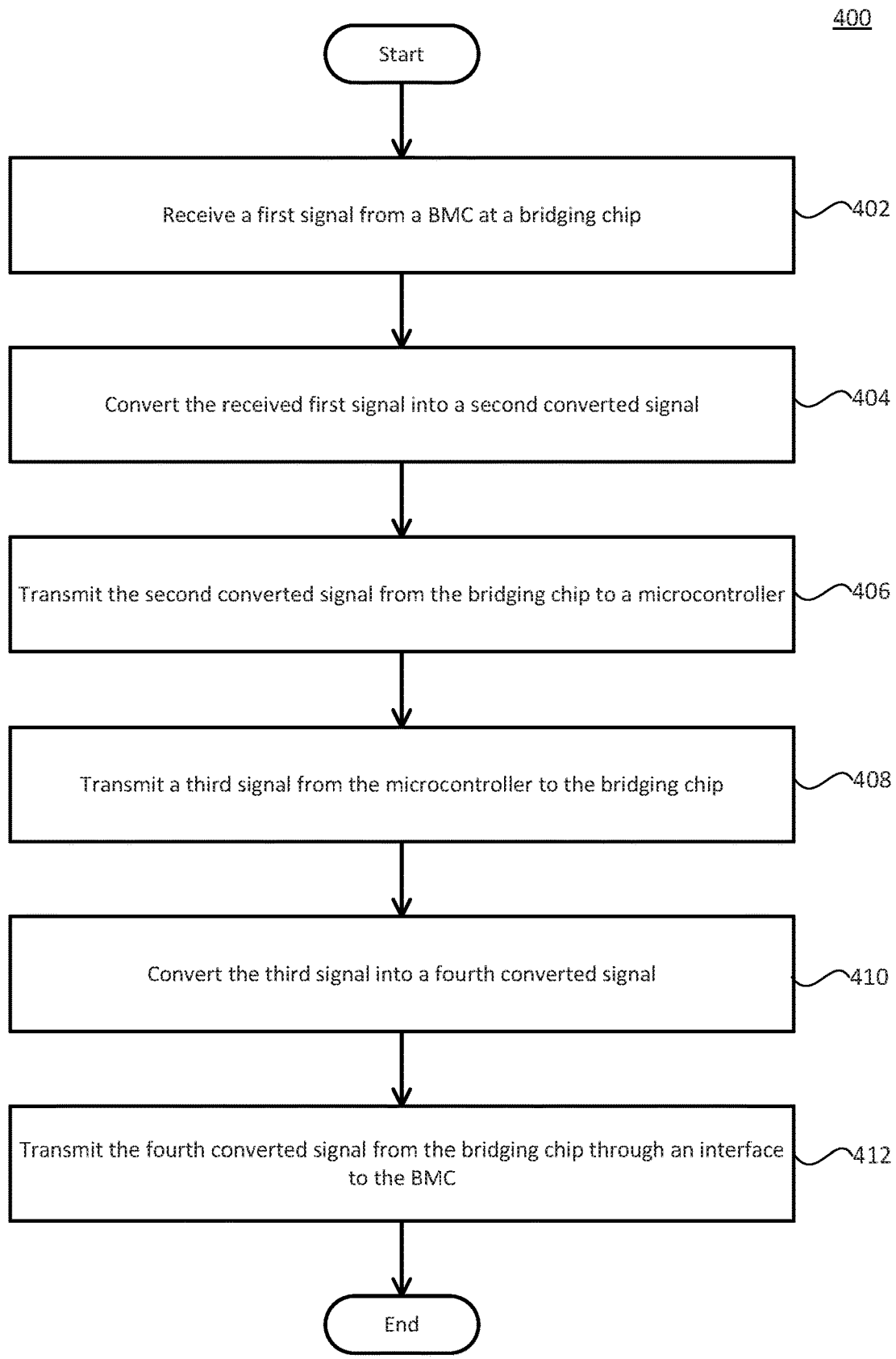
FIG. 4 is a flowchart describing an example method for communicating through a serial connection.

FIG. 4 is a flowchart illustrating an example method for transceiving signals through an example computing system. Method 400 describes signals being transmitted and received between a BMC and a microcontroller.

In step 402, a bridging chip receives a first signal from a BMC. In some examples, the first signal is a command from an administrator device. In certain examples, the first signal includes a command to establish an interactive, bidirectional serial connection between the BMC and a microcontroller on a daughterboard (e.g. a PCI-E card) of the computing system. The command may interrogate the microcontroller for information or the command may reconfigure the microcontroller. The first signal is transmitted using a first protocol (e.g. I2C), and may cross at least one interface (e.g. an interface between the BMC and a motherboard of the computing system, an interface between the motherboard and the daughterboard). The bridging chip, upon receiving the first signal, may retain portions of data included in the first signal in a buffer.

In step 404, the first signal is converted into a second converted signal. The bridging chip, upon retaining enough data of the first signal to convert a portion of the data to a second protocol (e.g. UART), begins converting the first signal into the second converted signal. In some examples, the first signal is converted in substantially real-time, with the buffer of the bridging chip used at times when the bridging chip cannot convert the entirety of the received signal before the next portion of the signal is received. In some other examples, the first signal is divided into discrete data packets, and the bridging chip retains portions of a data packet in the buffer until the entire data packet is received before converting it. In yet other examples, the bridging chip retains some or all of the first signal until a request to receive the first signal is sent to the bridging chip from the microcontroller.

In step 406, the bridging chip transmits the second converted signal to the microcontroller. In some examples, the bridging chip begins transmitting the second converted signal to the microcontroller prior to receiving the entirety of the first signal. In some other examples, the bridging chip begins transmitting the second converted signal upon receiving a request to receive the first signal from the microcontroller. The bridging chip is coupled to a terminal of the microcontroller capable of transceiving signals in the second protocol. In some examples, the terminal couples to a single data line. In some other examples, the terminal couples to more than one data line.

In step 408, the microcontroller transmits a third signal to the bridging chip. The third signal is in the second protocol. In some examples, the third signal includes a message in reply to the command of the first signal. In some other examples, the third signal includes informational data (e.g. error logs). The microcontroller may transmit the third signal upon detecting an error condition during the transition from a low-power mode to a high-power mode (e.g. when the computing system is powered on). In some examples, the microcontroller has not yet executed instructions to enable MCTP communications before transmitting the third signal. The terminal of the microcontroller capable of transceiving signals in the second protocol may be enabled during the entire transition from the low-power mode to the high-power mode.

In step 410, the bridging chip converts the third signal in the second protocol to a fourth converted signal in the first protocol. The bridging chip, upon retaining enough data of the third signal to convert a portion of the data to the first protocol (e.g. I2C), begins converting the third signal into the fourth converted signal. In some examples, the third signal is converted in substantially real-time, with the buffer of the bridging chip used at times when the bridging chip cannot convert the entirety of the received signal before the next portion of the signal is received. In some other examples, the third signal is divided into discrete data packets, and the bridging chip retains portions of a data packet in the buffer until the entire data packet is received before converting it. In yet other examples, the bridging chip retains some or all of the third signal until a request to receive the third signal is sent to the bridging chip from the BMC.

In step 412, the bridging chip transmits the fourth converted signal through an interface to the BMC. In some examples, the interface is an electrical coupling capable of transferring signals of the first protocol (e.g. I2C) between the daughterboard and the motherboard. In some examples, the bridging chip begins transmitting the fourth converted signal to the BMC prior to receiving the entirety of the third signal. In some other examples, the bridging chip begins transmitting the fourth converted signal upon receiving a request to receive the third signal from the BMC. The bridging chip is coupled to an interface between the daughterboard and the motherboard that is, in turn, coupled to an interface between the motherboard and the BMC. In some examples, the interfaces include a single data line. In some other examples, the interfaces include more than one data line.

Figure 5:
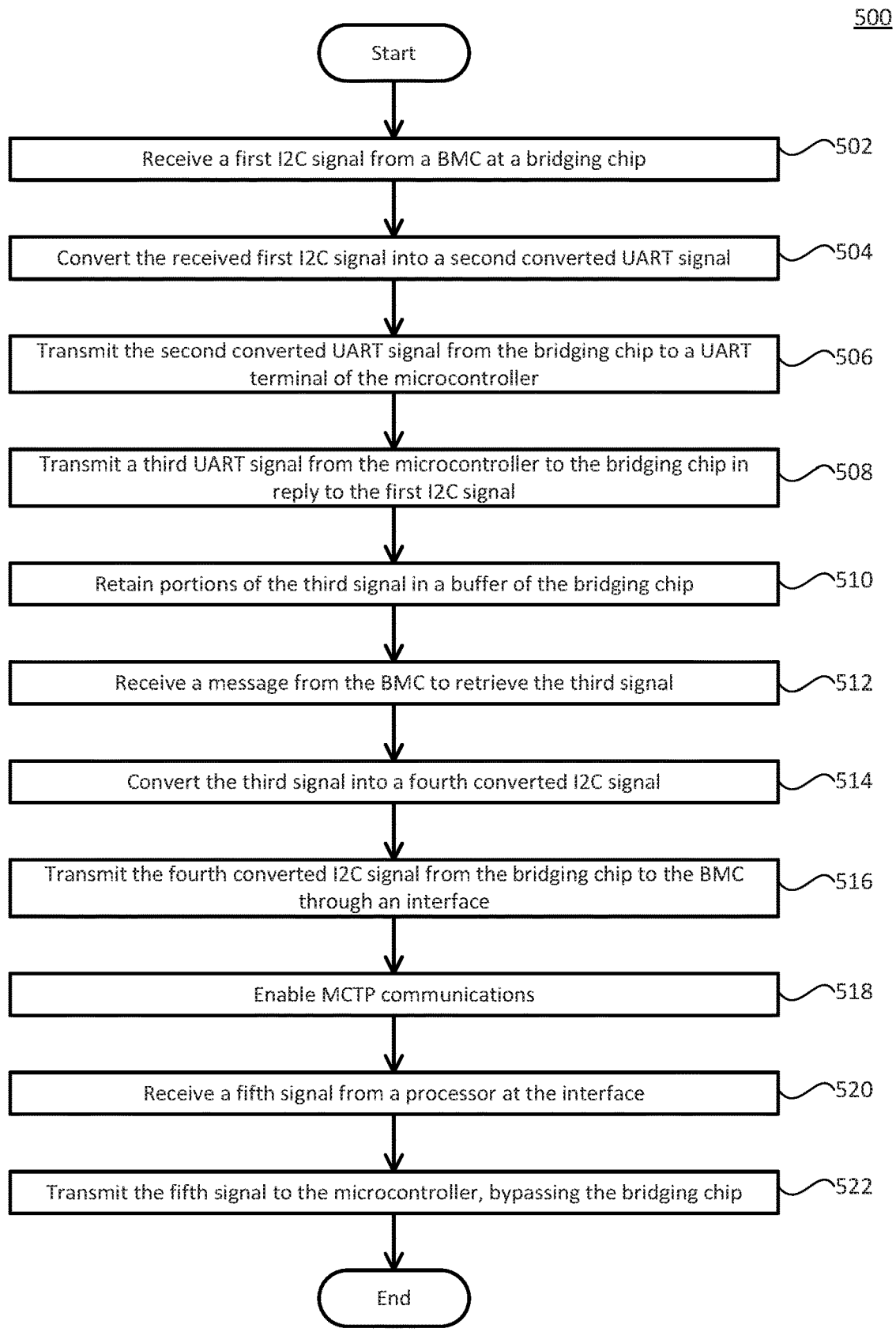
FIG. 5 is a flowchart describing an example method for communicating with a microcontroller.

FIG. 5 illustrates a flowchart of an example method of transceiving signals within an example computing system. Method 500 describes signals being transmitted and received between a BMC and a microcontroller.

In step 502, a bridging chip receives a first I2C signal from a BMC. In some examples, the first I2C signal is a command from an administrator device. In certain examples, the first I2C signal includes a command to establish an interactive, bidirectional serial connection between the BMC and a microcontroller on a daughterboard (e.g. a PCI-E card) of the computing system. The command may interrogate the microcontroller for information or the command may reconfigure the microcontroller. The first I2C signal is transmitted using I2C, and may cross at least one I2C interface (e.g. an interface between the BMC and a motherboard of the computing system, an interface between the motherboard and the daughterboard). The bridging chip, upon receiving the first I2C signal, may retain portions of data included in the first I2C signal in a buffer.

In step 504, the first I2C signal is converted into a second converted UART signal. The bridging chip, upon retaining enough data of the first I2C signal to convert a portion of the data to UART, begins converting the first I2C signal into the second converted UART signal. In some examples, the first I2C signal is converted in substantially real-time, with the buffer of the bridging chip used at times when the bridging chip cannot convert the entirety of the received signal before the next portion of the signal is received. In some other examples, the first I2C signal is divided into discrete data packets, and the bridging chip retains portions of a data packet in the buffer until the entire data packet is received before converting it. In yet other examples, the bridging chip retains some or all of the first I2C signal until a request to receive the first I2C signal is sent to the bridging chip from the microcontroller.

In step 506, the bridging chip transmits the second converted UART signal to the microcontroller. In some examples, the bridging chip begins transmitting the second converted UART signal to the microcontroller prior to receiving the entirety of the first I2C signal. In some other examples, the bridging chip begins transmitting the second converted UART signal upon receiving a request to receive the first I2C signal from the microcontroller. The bridging chip is coupled to a terminal of the microcontroller capable of transceiving signals in UART. In some examples, the terminal couples to a single data line. In some other examples, the terminal couples to more than one data line.

In step 508, the microcontroller transmits a third UART signal to the bridging chip. In some examples, the third UART signal includes a message in reply to the command of the first I2C signal. In some other examples, the third UART signal includes informational data (e.g. error logs). The microcontroller may transmit the third UART signal upon detecting an error condition during the transition from a low-power mode to a high-power mode (e.g. when the computing system is powered on). In some examples, the microcontroller has not yet executed instructions to enable MCTP communications before transmitting the third UART signal. The terminal of the microcontroller capable of transceiving signals in UART may be enabled during the entire transition from the low-power mode to the high-power mode.

In step 510, the bridging chip retains portions of the third UART signal in a buffer. In some examples, the third UART signal includes multiple data packets, and the bridging chip retains data contained in each data packet. In some other examples, the third UART signal is a stream of data, and the bridging chip retains the data as the third UART signal is received.

In step 512, the bridging chip receives a message from the BMC that requests the third UART signal be sent to the BMC. In some examples, the message from the BMC is an I2C signal similar to the first I2C signal. In certain examples, the first I2C signal may serve as the message requesting the third UART signal, and the bridging chip may immediately convert the third UART signal for sending to the BMC.

In step 514, the bridging chip converts the third UART signal to a fourth converted I2C signal. The bridging chip, upon retaining enough data of the third UART signal to convert a portion of the data to I2C, begins converting the third UART signal into the fourth converted I2C signal. In some examples, the third UART signal is converted in substantially real-time, with the buffer of the bridging chip used at times when the bridging chip cannot convert the entirety of the received signal before the next portion of the signal is received. In some other examples, the third UART signal is divided into discrete data packets, and the bridging chip retains portions of a data packet in the buffer until the entire data packet is received before converting it. In yet other examples, the bridging chip retains some or all of the third UART signal until a request to receive the third UART signal is sent to the bridging chip from the BMC. At such time, the bridging chip converts the third UART signal to the fourth converted I2C signal.

In step 516, the bridging chip transmits the fourth converted I2C signal through a first I2C interface between the daughterboard and the motherboard and through a second I2C interface between the motherboard and the BMC. In some examples, the I2C interfaces are electrical couplings capable of transferring I2C signals between the daughterboard and the motherboard or between the motherboard and the BMC, respectively. The bridging chip begins transmitting the fourth converted I2C signal upon receiving a request to receive the third UART signal from the BMC.

In step 518, the microcontroller executes instructions that are stored in a memory, the instructions causing the microcontroller to enable MCTP communication capabilities. In some examples, the enablement of MCTP capabilities occurs during the power up process of the computing system. In certain examples, MCTP is enabled too late in the power up process to be able to supply error logging information associated with the power up process to an administrator.

In step 520, the first I2C interface receives a fifth I2C signal from a processor of the motherboard. The fifth I2C signal is not associated with the interactive, bidirectional serial connection between the BMC and the microcontroller. In some examples, the fifth I2C signal is received at a different electrical contact than the first I2C signal. In some other examples, the fifth I2C signal is received at a same electrical contact as the first I2C signal.

In step 522, the fifth I2C signal is transmitted from the first I2C interface to the microcontroller, bypassing the bridging chip. The signal is transmitted to an I2C terminal of the microcontroller, thus not needing conversion to UART. In some examples, a routing component of the motherboard routes the fifth I2C signal to the I2C terminal of the microcontroller. In some other examples, instructions executed by the microcontroller ignore the output of the bridging chip received at the UART terminal, and process the fifth I2C signal received at the I2C terminal. The fifth I2C signal may be a request for information, a command to reconfigure the microcontroller, or any other appropriate message sent from the processor to the microcontroller.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

The invention claimed is:

1. A computing system, comprising: a baseboard management controller (BMC) including a serial interface; a motherboard; and a daughterboard communicatively coupled to the motherboard, the daughterboard comprising:

a universal asynchronous receiver/transmitter (UART) terminal; a microcontroller communicatively coupled to the BMC via an inter-integrated circuit (I2C) to universal asynchronous receiver/transmitter (UART) bridge, wherein the BMC establishes a serial connection with the microcontroller via the serial interface and the UART terminal; and the I2C to UART bridge, wherein the I2C to UART bridge converts an I2C signal transmitted from the serial interface of the BMC to a UART signal received by the microcontroller, and wherein the I2C to UART bridge converts a UART signal transmitted from the microcontroller to an I2C signal received at the serial interface of the BMC.

2. The system of claim 1, wherein the daughterboard is a Peripheral Component Interconnect Express (PCI-E) card communicatively coupled to the motherboard.

3. The system of claim 2, wherein the I2C to UART bridge is located on the PCI-E card such that an interface between the PCI-E card and the motherboard comprises a communication line between the I2C to UART bridge and the BMC.

4. The system of claim 3, wherein signals carried through the communication line across the interface are I2C signals.

5. The system of claim 1, wherein the serial connection between the BMC and the microcontroller is an interactive, bidirectional connection.

6. The system of claim 5, wherein the serial connection is established prior to the microcontroller executing instructions enabling Management Component Transport Protocol (MCTP) communications.

7. The system of claim 1, wherein the BMC establishes a second serial connection with an administrator device.

8. A method for communicating with a microcontroller, comprising:
receiving a first signal from a baseboard management controller (BMC) of a computing system at a bridging chip of a daughterboard communicatively coupled to a motherboard through an interface;
converting, at the bridging chip of the daughterboard, the received first signal into a second converted signal;
transmitting, from the bridging chip to a Universal Asynchronous Receiver/Transmitter (UART) terminal of a microcontroller of the daughterboard, the second converted signal;
transmitting, from the microcontroller to the bridging chip, a third signal, wherein the second converted signal and the third signal are UART signals, and wherein the third signal is a reply to the first signal;
converting, at the bridging chip, the third signal into a fourth converted signal; and
transmitting, from the bridging chip through the interface, the fourth converted signal to the BMC.

9. The method of claim 8, wherein the first signal includes a command from an administrator device to alter a logging level configuration parameter of the microcontroller.

10. The method of claim 8, further comprising: retaining, at the bridging chip, portions of the third signal in a buffer of the bridging chip until retrieved by the BMC.

11. The method of claim 8, further comprising:
receiving a fifth signal from a processor of the motherboard at the interface; and
transmitting the fifth signal to the microcontroller by bypassing the bridging chip.

12. The method of claim 8, wherein the second converted signal is received at the microcontroller and the third signal is sent from the microcontroller prior to the microcontroller executing instructions enabling Management Component Transport Protocol (MCTP) communications.

13. A daughterboard, comprising:
an electrical contact to communicatively couple with a corresponding electrical contact of a motherboard;
a microcontroller comprising an I2C terminal; and
an inter-integrated circuit (I2C) to universal asynchronous receiver/transmitter (UART) bridging chip communicatively coupled with the electrical contact of the daughterboard and the microcontroller to convert a first I2C signal received at the electrical contact to a first UART signal to be sent to a UART terminal of the microcontroller and to convert a second UART signal sent from the UART terminal of the microcontroller to a second I2C signal to be sent to the electrical contact, wherein signals converted at the I2C to UART bridging chip comprise messages corresponding to a serial connection between a baseboard management controller (BMC) and the microcontroller, and wherein when a third I2C signal is received at the electrical contact and the third I2C signal does not comprise data corresponding to the serial connection between the BMC and the microcontroller, the third I2C signal is sent to the I2C terminal of the microcontroller, bypassing the I2C to UART bridging chip.

14. The daughterboard of claim 13, wherein the serial connection between the BMC and the microcontroller is an interactive, bidirectional connection.

15. The daughterboard of claim 13, wherein the I2C to UART bridging chip buffers portions of the second UART signal until retrieved by the BMC.

\* \* \* \* \*